US008584594B2

(12) United States Patent
Dehne et al.

(10) Patent No.: US 8,584,594 B2
(45) Date of Patent: Nov. 19, 2013

(54) FRICTION DRIVE CONVEYOR ASSEMBLY

(75) Inventors: Noel F. Dehne, Novi, MI (US); Mark T. Domm, Farmington Hills, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 13/365,400

(22) Filed: Feb. 3, 2012

(65) Prior Publication Data
US 2013/0199403 A1 Aug. 8, 2013

(51) Int. Cl.
*B61B 9/00* (2006.01)
(52) U.S. Cl.
USPC ............ 104/165; 104/172.3; 104/172.4
(58) Field of Classification Search
USPC ........................................ 104/89–102
See application file for complete search history.

(56) References Cited

U.S. PATENT DOCUMENTS

| 4,031,829 | A | * | 6/1977 | Bell et al. ............ 104/172.4 |
| 4,279,201 | A | * | 7/1981 | Solomon ............... 104/100 |
| 4,498,399 | A | * | 2/1985 | Wakabayashi ............ 104/96 |
| 4,745,865 | A | * | 5/1988 | Dehne ................ 104/172.3 |
| 4,928,383 | A | | 5/1990 | Kaczmarek et al. |
| 4,991,517 | A | * | 2/1991 | Lotzer ................ 104/165 |
| 6,494,142 | B2 | | 12/2002 | Masugaki et al. |
| 6,749,055 | B2 | | 6/2004 | Takano et al. |
| 7,127,997 | B2 | | 10/2006 | Nishihara et al. |
| 7,296,521 | B2 | * | 11/2007 | Kawato et al. ............ 104/103 |
| 7,306,089 | B2 | * | 12/2007 | Ellens ................ 198/465.3 |
| 7,484,616 | B2 | * | 2/2009 | Nakamura ............ 198/465.4 |
| 7,721,871 | B2 | * | 5/2010 | Takano et al. ............ 198/346.2 |
| 7,789,021 | B2 | * | 9/2010 | Nishihara et al. ............ 105/153 |
| 7,798,068 | B2 | * | 9/2010 | Nishihara et al. .......... 104/172.4 |
| 7,997,208 | B2 | * | 8/2011 | Tabler ................ 104/96 |
| 2004/0107862 | A1 | * | 6/2004 | Suh ................ 104/91 |
| 2005/0061194 | A1 | * | 3/2005 | Tada et al. ............ 104/165 |

FOREIGN PATENT DOCUMENTS

| DE | 19616959 A1 | 7/1997 |
| DE | 19828435 A1 | 12/1999 |
| EP | 0497209 A2 | 8/1992 |
| EP | 0921052 A2 | 6/1999 |

* cited by examiner

*Primary Examiner* — Jason C Smith
(74) *Attorney, Agent, or Firm* — Dickinson Wright PLLC

(57) ABSTRACT

An overhead mounted friction drive conveyor assembly including a biasing section for biasing objects such as car doors. The conveyor assembly includes a conveying rail and a biasing rail extending in spaced and parallel relationship with the conveying rail. The conveyor assembly also includes at least three trolleys and at least two tow bars extending between and interconnecting the trolleys. A biasing mechanism allows at least two of the trolleys to remain on the conveying rail and guides at least one trolley onto the biasing rail so that one of the tow bars extends between the biasing rails. The object is disposed on the tow bar extending between the biasing rails. A plurality of friction drivers are disposed on the conveying rail for only driving the tow bar extending between the trolleys on the conveying rail.

17 Claims, 5 Drawing Sheets

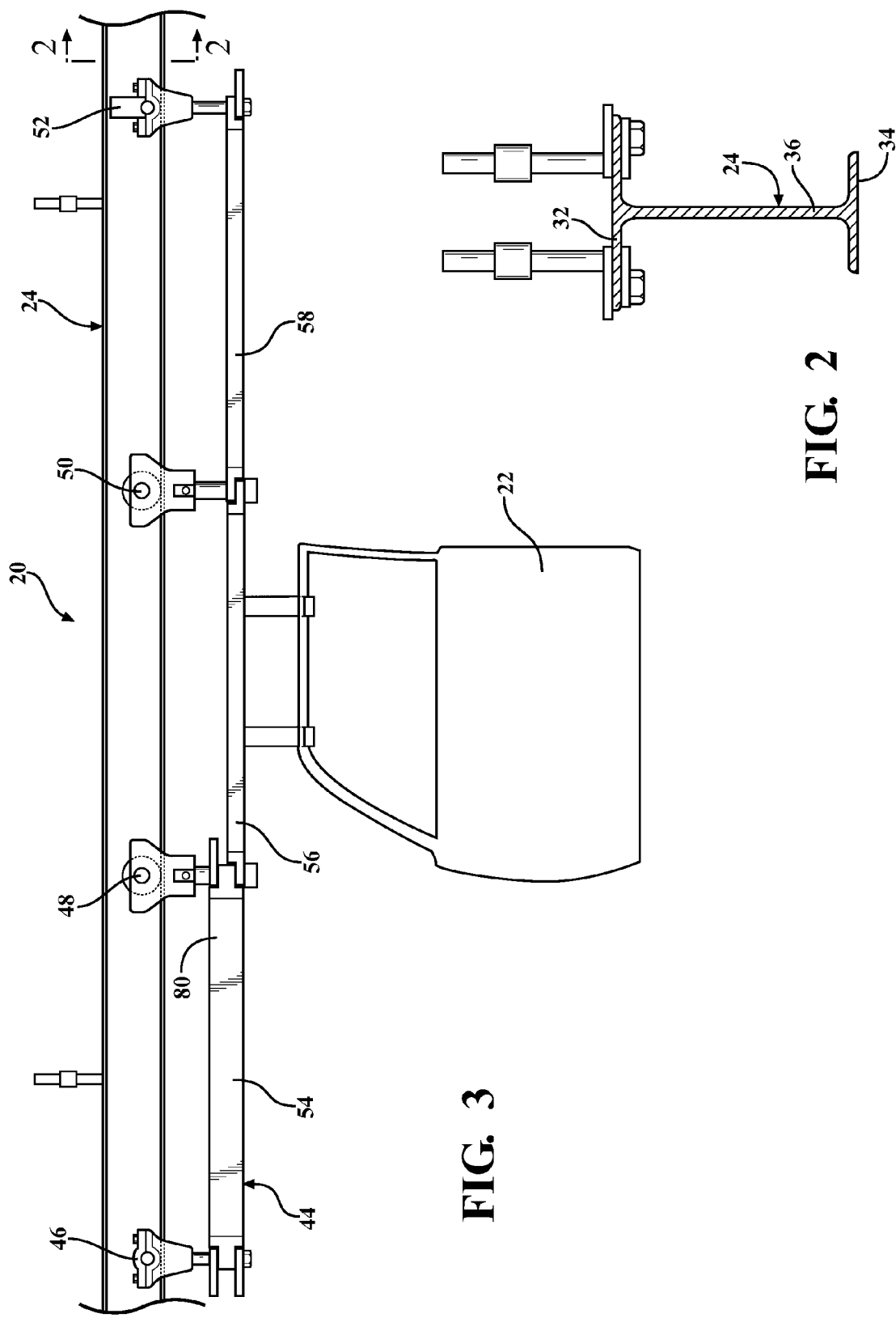

FRICTION DRIVE CONVEYOR ASSEMBLY

BACKGROUND OF THE INVENTION

1. Field of the Invention

The subject invention is related to overhead mounted friction drive conveyor assemblies, and more particularly to overhead mounted friction drive conveyor assemblies for biasing a plurality of objects.

2. Brief Description of the Prior Art

Overhead mounted friction drive conveyor assemblies are widely used in automobile assembly plants for moving objects, such as car doors, through a plurality of work stations on the assembly line. During the typical assembly process of a vehicle, the doors are attached to the vehicle body and both components are painted together. Next, the doors are removed from the vehicle body and placed onto the conveyor assembly so that the vehicle body can be worked on without the doors in the way and vice versa. Later in the assembly process, the car doors are removed from the conveyor assembly and re-attached to the vehicle body.

One problem with such an assembly process is that the friction drive conveyor assembly holding objects (e.g., in this case doors) in a direction parallel with the direction of motion can consume valuable conveyor line space. This is because typical friction drive conveyor assemblies do not have any way to efficiently store car doors.

For other types of conveyor assemblies, i.e. non-friction drive conveyor assemblies, conveyor assembly biasing has been used to offline car doors and other objects. In biasing, the object being conveyed is angled relative to the direction of motion, and thus, more space is provided along the direction of motion to efficiently offline such objects. However, numerous design challenges have thus far prevented biasing from being used in friction drive conveyor assemblies.

There remains a significant and continuing need for an improved friction drive conveyor assembly for biasing objects such as car doors.

SUMMARY OF THE EXEMPLARY EMBODIMENT

According to one aspect of the invention, an overhead mounted friction drive conveyor assembly is provided including a conveying rail and a biasing rail. The conveying and biasing rails are spaced from one another and extend generally parallel with one another. The conveyor assembly also includes a carrier assembly having at least three trolleys, a leading tow bar and at least one trailing tow bar. The conveyor assembly further includes a biasing mechanism for guiding at least two of the trolleys onto the biasing section of the conveying rail and for guiding at least one of the trolleys onto the biasing rail. A plurality of stationary friction drivers are disposed along the biasing section of the conveying rail for moving said carrier assembly, and the stationary friction drivers are configured to only engage the leading tow bar, which extends between the trolleys on the biasing section of the conveying rail. The trailing tow bars, on the other hand, are undriven and are pulled by the leading tow bar.

According to another aspect of the invention, the leading tow bar has a first height, and the trailing tow bars have a second height which is less than the first height. In each carrier assembly, the bottoms of all of the tow bars are generally planar with one another, and therefore, the leading tow bar has driven portion which rises above the trailing tow bars. The friction drivers on the biasing section of the conveying rail only engage the driven portion of the leading tow bar, and therefore, the trailing tow bars pass underneath the friction drivers without contacting the friction drivers.

An object, such as a car door, is attached to one of the trailing tow bars. Since this tow bar extends between the conveying and biasing rails during biasing, the object is angled relative to the direction of the rails. Thus, adjacent carrier assemblies can be moved closer to one another, and the objects can be more efficiently stored, which allows the conveyor assembly to continue operating even if the objects cannot be used immediately. The additional cost for this improved efficiency is minimized because the same type of friction driver can be used for both the biasing and non-biasing sections of the conveyor assembly. In the non-biasing sections, the friction drivers are positioned lower so that they can drive all of the tow bars. In contrast, in the biasing sections, the friction drivers are positioned higher so that they only drive the larger, leading tow bar.

BRIEF DESCRIPTION OF THE DRAWINGS

These and other advantages and features of the present invention will be readily appreciated, as the same becomes better understood by reference to the following detailed description when considered in connection with the accompanying drawings wherein:

FIG. 2 is a cross-sectional view of an exemplary rail;

FIG. 3 is a side view of an exemplary carrier assembly supporting a car door;

FIG. 8 is a flow chart of an exemplary method of biasing objects on an overhead mounted friction drive conveyor assembly.

DETAILED DESCRIPTION OF THE ENABLING EMBODIMENTS

Figure 1:
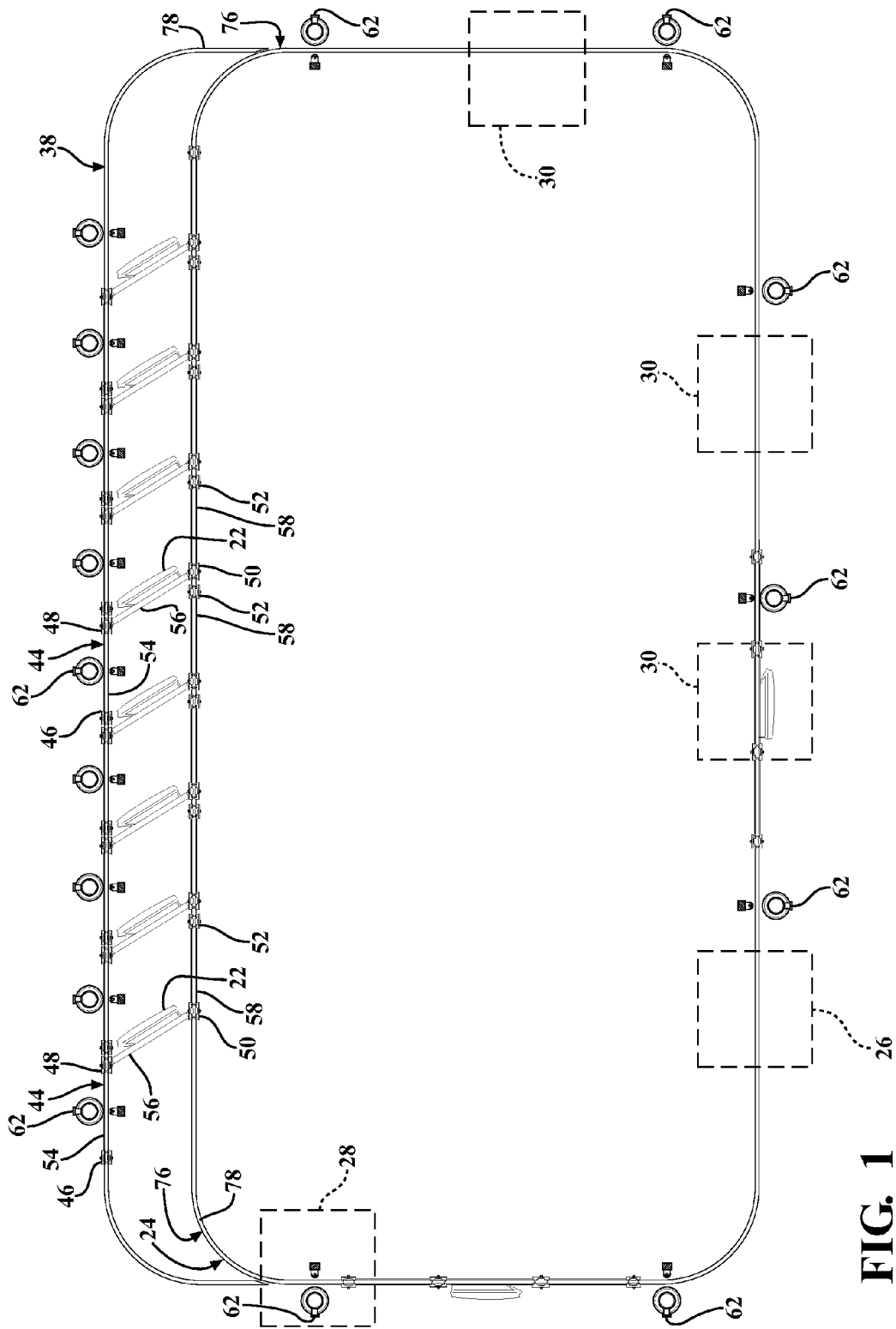
FIG. 1 is a schematic view of the exemplary overhead mounted friction drive conveyor assembly.

Referring to the Figures, wherein like numerals indicate corresponding parts throughout the several views, an overhead mounted friction drive conveyor assembly 20 is schematically shown in FIG. 1. In the exemplary embodiment, the conveyor assembly 20 is for moving car doors 22 through a predetermined path in an automobile assembly plant, and therefore, the objects being moved by the conveyor assembly 20 are hereinafter referred to as car doors 22. However, it should be appreciated that the conveyor assembly 20 could be employed in a wide range of industries and could be used to move any desirable object, not just car doors 22.

The conveyor assembly 20 includes a conveying rail 24, generally indicated, which extends through a predetermined path through the assembly plant. In the exemplary embodiment, the conveying rail 24 extends through a paint zone 26 where freshly painted car doors 22 are placed onto the conveyor assembly 20 to a final assembly zone 28 where the car doors 22 are removed from the conveyor assembly 20 and placed on a car body (not shown). The car doors 22 can be removably attached to the conveyor assembly 20 with hooks, latches or any other desirable attachment mechanism. The conveying rail 24 also passes through a number of work stations 30 for performing various steps in the assembly of the car door 22 before it reaches the final assembly zone 28 and is attached to the car body. For example, one of the work stations 30 could be for installing seals onto the car doors 22, and another of the work stations 30 could be for installing a latching mechanism on the car doors 22.

Referring now to FIG. 2, in the exemplary embodiment, the conveying rail 24 is mounted to the ceiling of the assembly plant and has an I-beam shaped cross-section with an upper horizontal member 32, a lower horizontal member 34 and a vertical member 36 extending between the horizontal members 32, 34. It should be appreciated that the conveying rail 24 could have any other shape including, for example, a tubular shape, a double channel shape or a T-shape. Referring back to FIG. 1, the conveying rail 24 can extend through straight sections, curves, inclines, declines or many other directions. The conveying rail 24 could be of one continuous piece or it could be composed of many pieces laid end to end along the predetermined path. The conveying rail 24 also includes a biasing section 38 with a biasing rail 42 disposed adjacent thereto. However, as will be discussed in further detail below, during normal operation of the conveyor assembly 20, the biasing rail 42 is not used. It should also be appreciated that the conveying rail 24 could be mounted to any other overhead structure, i.e. not just a ceiling.

Figure 4:
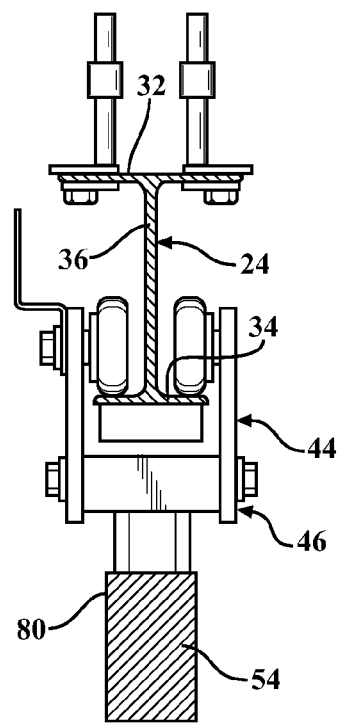
FIG. 4 is a front view of an exemplary trolley disposed on a rail.

Referring now to FIG. 3, a car door 22 is removably attached to a carrier assembly 44, which transports the car door 22 along the rail 24. Each carrier assembly 44 includes a plurality of trolleys 46, 48, 50, 52 interconnected with one another through a plurality of tow bars 54, 56, 58. Referring now to FIG. 4, which shows an exemplary trolley 46, the trolleys 46, 48, 50, 52 include at least two undriven rollers 60 which engage the lower horizontal member 34 of the I-beam shaped rail 24 for supporting the trolley on the rail 24. The undriven rollers 60 allow the trolleys 46, 48, 50, 52 to roll along the rail 24, as will be understood by those of skill in the art.

Referring back to FIG. 3, each carrier assembly 44 includes four trolleys 46, 48, 50, 52 defined serially as a leading trolley 46, a second trolley 48, a third trolley 50 and a last trolley 52. Each carrier assembly 44 also includes a leading tow bar 54 extending between the leading trolley 46 and the second trolley 48; a first trailing tow bar 56 extending between the second and third trolleys 48, 50; and a second trailing tow bar 58 extends between the third and last trolleys 50, 52. The tow bars 54, 56, 58 are pivotally connected to the trolleys 46, 48, 50, 52 in a manner known to those of skill in the art, and therefore, the tow bars 54, 56, 58 can pivot relative to one another, for example, when the carrier assembly 44 is traveling through a curved section of the rail 24. In operation, the car door 22 is removably coupled to the first trailing tow bar 56 of each carrier assembly 44. It should be appreciated that the carrier assemblies 44 could include any desirable number of trolleys 46, 48, 50, 52 and tow bars 54, 56, 58.

Figure 5:
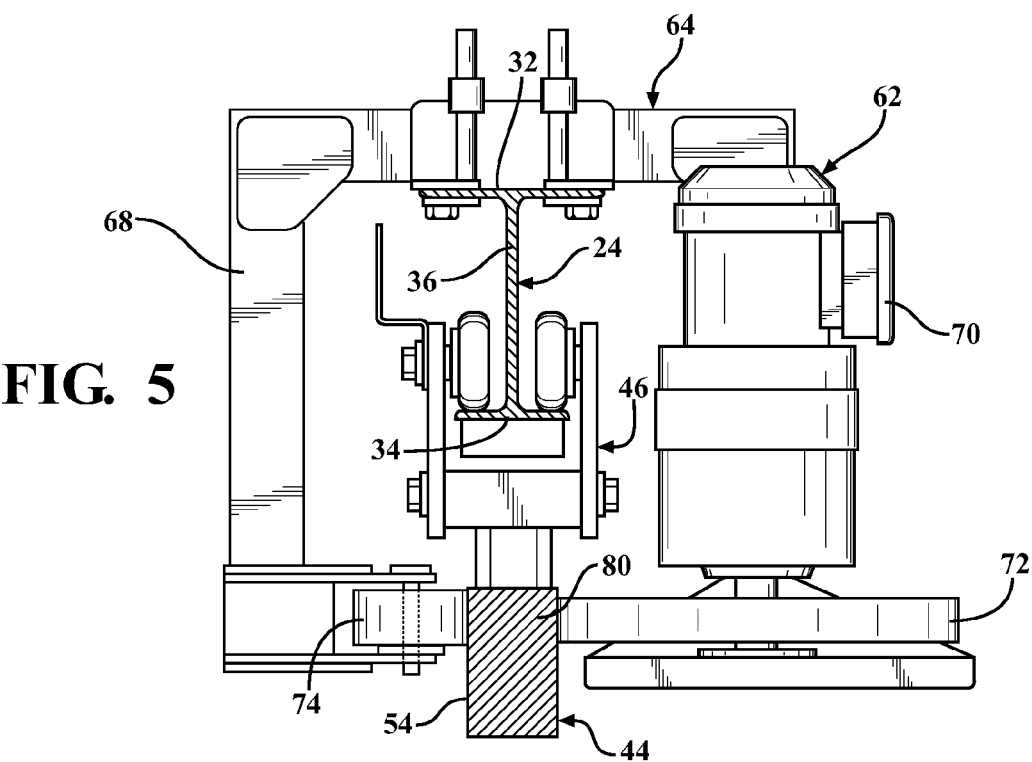
FIG. 5 is a front view of an exemplary friction driver in frictional engagement with a trailing tow bar.

As with conventional friction drive assemblies, the carrier assemblies 44 are propelled along the conveying rail 24 by a plurality of stationary and strategically positioned friction drivers 62. As shown in FIG. 5, each of the friction drivers 62 includes a generally U-shaped bracket 64 with a base 66 engaging the upper horizontal member 32 of the conveying rail 24 and a pair of legs 68 extending downwardly below the conveying rail 24. An electric motor 70 (or a similar type of actuator) is disposed on one of the legs 68 for rotating a driven wheel 72. The circumference of the driven wheel 72 is preferably of a high friction material for frictionally engaging the tow bars 54, 56, 58 of the carrier assemblies 44 and applying a friction force thereon to propel the carrier assemblies 44 along the conveying rail 24. An undriven wheel 74 is coupled to the other leg 68 of the U-shaped bracket 64 for maintaining the friction contact between the tow bars 54, 56, 58 and the driven wheel 72. The driven and undriven wheels 72, 74 are spaced from one another by a gap which is sized similarly to the width of the tow bars 54, 56, 58.

In operation, the tow bars 54, 56, 58 of each carrier assembly 44 pass into the gap between the driven and undriven wheels 72, 74, and friction between the tow bars 54, 56, 58 and the driven wheel 72 propels the carrier assembly 44 forward along the conveying rail 24. The friction drivers 62 are strategically positioned such that at any point along the predetermined path, one of the tow bars 54, 56, 58 remains in contact with at least one friction driver 62. The electric motors 70 of the friction drivers 62 are in electrical communication with a controller (not shown), which individually controls the movement of each of the carrier assemblies 44 on the predetermined path. The controller can control the speed of the carrier assemblies 44 disposed on the rail 24 and can stop the carrier assemblies 44, if desired.

Figure 6:
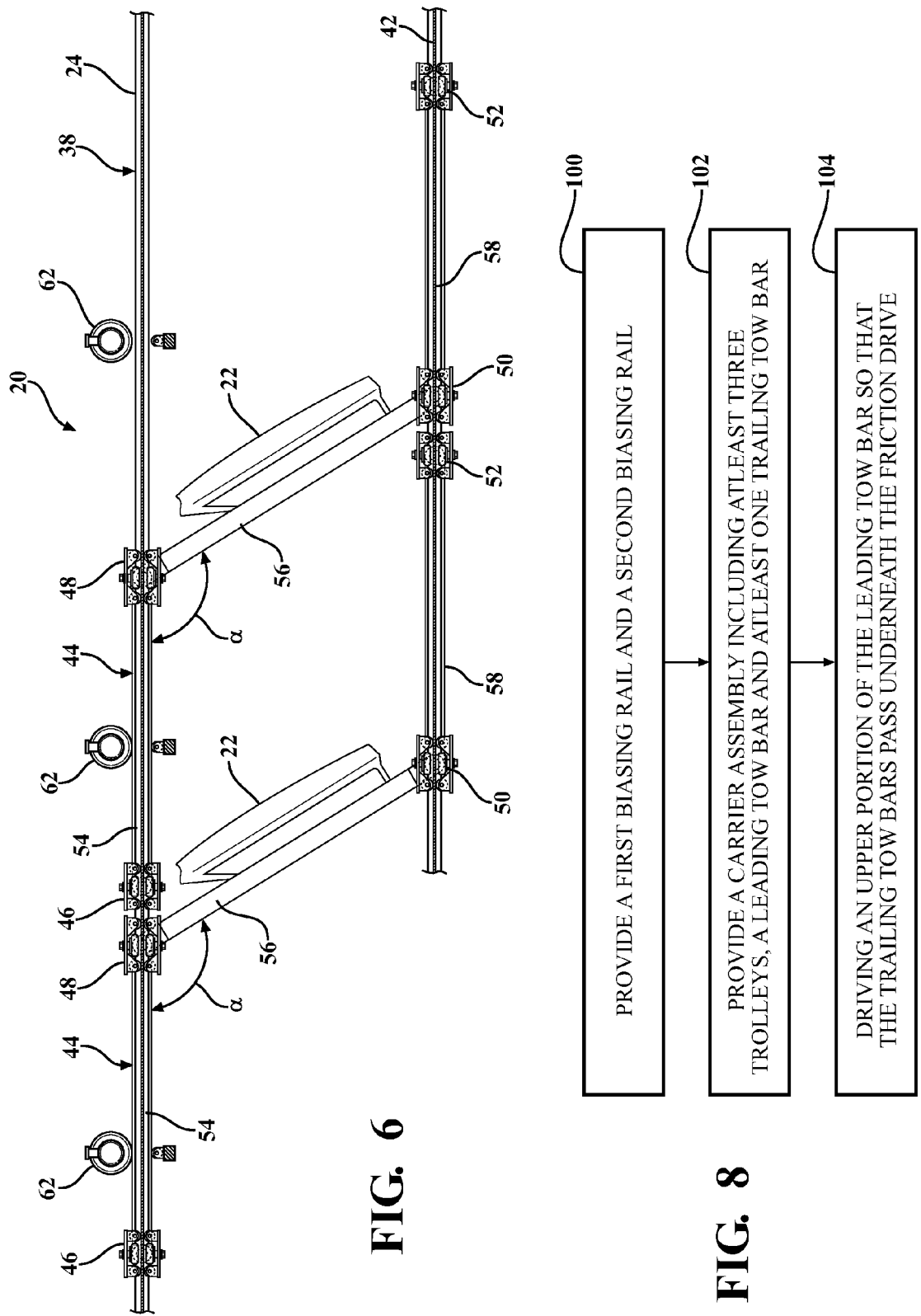
FIG. 6 is a schematic view of the biasing section of the exemplary conveyor assembly.

In certain circumstances, it is desirable to store a number of car doors 22 on the conveyor assembly 20. One such scenario is where the vehicle body portion (not shown) of the assembly plant is disabled, but all of the work stations 30 along the predetermined path of the conveyor assembly 20 are functioning properly. Rather than shut down the conveyor assembly 20, it might be desirable to continue production and store the completed car doors 22 until the vehicle body assembly line returns to operation. However, each carrier assembly 44 takes a length of conveying rail 24 approximately equal to the lengths of the tow bars 54, 56, 58, and therefore, a limited number of car doors 22 can be stored along the length of the conveying rail 24. To overcome this problem, the conveyor assembly 20 includes a biasing section 38 with a biasing rail 42 for more efficiently storing the completed car doors 22. As shown in FIG. 6, when biasing is desired, the car doors 22 in the biasing section 38 are angled relative to the direction of the conveying and biasing rails 24, 42, and thus, the carrier assemblies 44 can be moved more closely together and the conveyor assembly 20 can continue operating until the biasing section 38 is full.

The biasing section 38 includes the conveying rail 24 and a biasing rail 42 extending in generally parallel relationship with one another. Referring back to FIG. 1, the conveying and biasing rails 24, 42 are joined with the non-biasing portion of the conveying rail 24 in a pair of junctions 76. Each junction 76 includes a branching mechanism with a piece of branching rail 78 which is configured to pivot between a first position for guiding the trolleys 46, 48, 50, 52 onto or off of the non-biasing section of the conveying rail 24 and a second position for guiding the trolleys 46, 48, 50, 52 onto or off of the biasing rail 42. The branching mechanisms are preferably electrically powered and are in electrical communication with the controller, which controls the positioning of the branching rails 78. When biasing is desired, the branching rail 78 at the entrance of the biasing section 38 is held in the first position until the leading and second trolleys 46, 48 have cleared the branching rail 78 and are on the biasing section of the conveying rail 24. Then, the controller operates to move the branching rail 78 into the second position so that the third and last trolleys 50, 52 are guided onto the biasing rail 42. The controller then quickly pivots back to the first position so that the leading and second trolleys 46, 48 of the next carrier assembly 44 are guided onto the biasing section of the conveying rail 24.

The biasing rail 24 is spaced from the biasing section of the conveying rail 24 by a distance which is less than the length of the first trailing tow bar 56. Thus, during biasing, the first trailing tow bar 56 of each carrier assembly 44 is disposed at an angle α of greater than ninety degrees (90°) relative to the leading tow bar 54. As will be discussed in greater detail below, this configuration allows for only the leading tow bar 54 to be driven, and the leading tow bar 54 pulls the undriven trailing tow bars 56, 58 along the biasing section 38. As shown in FIG. 6, during biasing, adjacent carrier assemblies 44 are also moved closer to one another in the biasing section 38.

Figure 7:
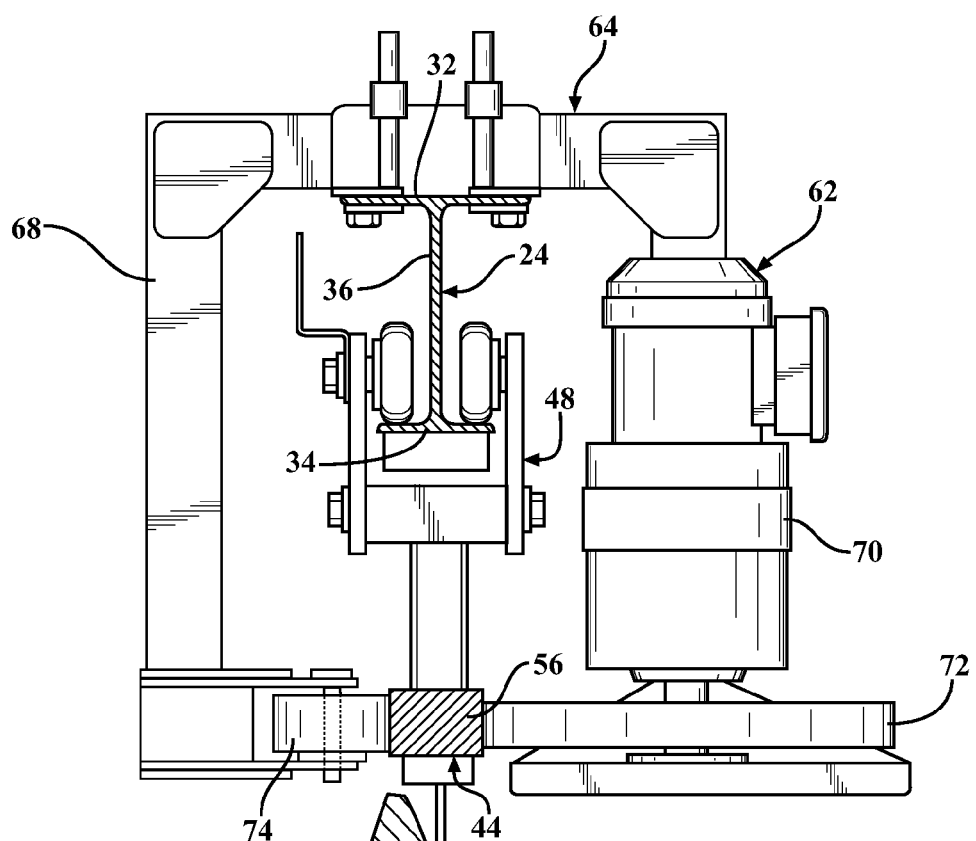
FIG. 7 is a front view of an exemplary friction driver in a biasing section of the conveyor assembly and in frictional engagement with a leading tow bar.

The friction drivers 62 on the biasing section of the conveying rail 24 are configured to only engage the leading tow bar 54 of each carrier assembly 44 and to allow the trailing tow bars 56, 58 to pass therethrough untouched. As shown in FIG. 3, this is accomplished by sizing the leading and trailing tow bars 54, 56, 58 differently from one another. Specifically, the leading tow bar 54 of each carrier assembly 44 has a first height and the trailing tow bars 56, 58 have a second height which is less than the first height. All of the tow bars 54, 56, 58 are positioned such that their bottoms are generally planar with one another, and therefore, the leading tow bar 54 includes an upper portion 80 which is disposed vertically above the tops of the trailing tow bars 56, 58. Referring now to FIG. 7, the friction drivers 62 in the biasing section 38 are positioned so that they only engage this upper portion 80 of the leading tow bar 54. When the trailing tow bars 56, 58 approach the friction drivers 62 in the biasing section 38, they simply pass underneath the driven and undriven wheels 72, 74 untouched.

FIG. 8 shows a flow chart for a method of biasing objects on an overhead mounted friction drive conveyor assembly 20. The method starts with the step 100 of providing a conveying rail 24 and a biasing rail 42 spaced from and extending generally parallel to one another. The method continues with the step 102 of providing a carrier assembly 44 including at least three trolleys 46, 48, 50, 52, a leading tow bar and at least one trailing tow bar. The leading tow bar 54 has a first height, and the trailing tow bars 56, 58 have a second height which is less than the first height. The method then proceeds with the step 104 of driving with a friction driver 62 an upper portion of the leading tow bar 54 above the trailing tow bars 56, 58 so that the trailing tow bars 56, 58 pass underneath the friction driver 62.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. An overhead mounted friction drive conveyor assembly comprising:
   a conveying rail;
   a biasing rail offset from and extending generally parallel to said conveying rail;
   a carrier assembly including at least three trolleys, a leading tow bar and a trailing tow bar;
   said leading tow bar having a first height and said trailing tow bar having a second height, wherein said first height of said leading tow bar is greater than said second height of said trailing tow bar; and
   a plurality of stationary friction drivers disposed along said conveying rail for moving said carrier assembly, wherein said stationary friction drivers are configured to only engage said leading tow bar and wherein said trailing tow bar is undriven.

2. The friction drive conveyor assembly as set forth in claim 1 wherein said leading tow bar is larger than said trailing tow bar.

3. The friction drive conveyor assembly as set forth in claim 1 wherein said plurality of trolleys includes a leading trolley and a second trolley and a third trolley and a last trolley.

4. The friction drive conveyor assembly as set forth in claim 3 wherein said leading tow bar extends between said leading and second trolleys and wherein said trailing tow bar is a first trailing tow bar extending between said second and third trolleys and further including a second trailing tow bar extending between said third and last trolleys.

5. The friction drive conveyor assembly as set forth in claim 4 wherein the bottoms of said trailing tow bars are generally planar with the bottom of said leading tow bar such that said leading tow bar has an upper portion disposed vertically above the tops of said trailing bars.

6. The friction drive conveyor assembly as set forth in claim 5 wherein each of said friction drivers on said conveying rail includes at least one driven wheel positioned such that it engages only said upper portion of said leading tow bar disposed vertically above the tops of said trailing tow bars.

7. The friction drive conveyor assembly as set forth in claim 1 wherein said biasing rail is spaced from said conveying rail a distance which is less than the length of said tow bars.

8. The friction drive conveyor assembly as set forth in claim 1 wherein each of said friction drivers includes at least one driven wheel and at least one undriven wheel.

9. The friction drive conveyor assembly as set forth in claim 8 wherein said driven and undriven wheels of said friction drivers are spaced from one another by a gap sized similarly to the width of said tow bars.

10. The friction drive conveyor assembly as set forth in claim 1 wherein said conveying and biasing rails each have an I-shaped cross-section.

11. The friction drive conveyor assembly as set forth in claim 1 wherein said conveying rail includes a biasing section and a non-biasing section.

12. The friction drive conveyor assembly as set forth in claim 11 where said biasing rail is joined to said conveying rail through a pair of biasing mechanisms each including a branching rail.

13. The friction drive conveyor assembly as set forth in claim 12 wherein said non-biasing section of said conveying rail includes a plurality of friction drivers spaced farther from one another than said friction drivers on said biasing section of said conveying rail.

14. An overhead mounted friction drive conveyor assembly comprising:
   a conveying rail;
   a biasing rail offset from and extending generally parallel to said conveying rail;
   a carrier assembly including at least three trolleys, a leading tow bar and a trailing tow bar;
   a plurality of stationary friction drivers disposed along said conveying rail for moving said carrier assembly, wherein said stationary friction drivers are configured to only engage said leading tow bar and wherein said trailing tow bar is undriven;
   each of said friction drivers including at least one driven wheel and at least one undriven wheel;
   said driven and undriven wheels of said friction drivers being spaced from one another by a gap sized similarly to the width of said tow bars; and
   wherein each of said friction drivers includes a U-shaped bracket and wherein said undriven wheel is coupled to one leg of said U-shaped bracket and wherein said driven wheel is coupled to another leg of said U-shaped bracket.

15. The friction drive conveyor assembly as set forth in claim 14 wherein said driven wheel is coupled to an electric motor.

16. A method of biasing objects on an overhead mounted friction drive conveyor assembly, comprising the steps of:
   providing a conveying rail and a biasing rail spaced from and extending generally parallel to one another;
   providing a carrier assembly including at least three trolleys and a plurality of tow bars extending between and interconnecting the trolleys, the plurality of tow bars including a leading tow bar having a first height and a trailing tow bar having a second height, and wherein the first height of the leading tow bar is greater than the second height of the trailing tow bar;
   selectively guiding at least one trolley but not all of the trolleys onto the biasing rail such that at least one of the tow bars extends parallel to the conveying rail and at least one tow bar extends between the conveying and biasing rails; and
   driving only the tow bar parallel to the conveying rail with a friction driver.

17. The method as set forth in claim 16 wherein the step of driving the tow bar with the friction driver is further defined as driving only an upper portion of the leading tow bar disposed above the trailing tow bar so that the trailing tow bar passes underneath the friction driver.

* * * * *